United States Patent [19]

Ling

[11] 4,422,535

[45] Dec. 27, 1983

[54] COMPOUND DAMPER ASSEMBLY FOR AN AUTOMATIC TRANSMISSION

[75] Inventor: Ching-Chung Ling, Plymouth, Mich.

[73] Assignee: Ford Motor Company, Dearborn, Mich.

[21] Appl. No.: 265,496

[22] Filed: May 20, 1981

[51] Int. Cl.³ .............................................. F16D 3/66
[52] U.S. Cl. ................................ 192/3.28; 192/106.2; 464/63
[58] Field of Search .................... 192/3.28, 3.29, 3.3, 192/3.31, 55, 106.2, 70.17, 70.18, 106.1; 464/68, 66, 63, 67, 62

[56] References Cited

U.S. PATENT DOCUMENTS

| | | | |
|---|---|---|---|
| 3,101,600 | 8/1963 | Stromberg | 464/68 X |
| 3,266,271 | 8/1966 | Stromberg | 192/106.2 |
| 3,280,949 | 9/1964 | Ross | 192/106.1 |
| 3,314,307 | 4/1967 | Egbert | 74/688 |
| 3,414,101 | 12/1968 | Binder et al. | 192/106.2 |
| 3,491,617 | 1/1970 | Konrad | 74/688 |
| 4,027,757 | 6/1977 | Radke et al. | 192/106.2 |
| 4,101,015 | 7/1978 | Radke | 464/68 X |
| 4,138,003 | 2/1979 | Malloy | 192/3.29 |
| 4,143,561 | 3/1979 | Melhorn | 74/30 |
| 4,181,208 | 1/1980 | Davis | 192/3.29 X |
| 4,239,097 | 12/1980 | Greacen et al. | 192/106.2 |
| 4,304,107 | 12/1981 | Fall et al. | 192/106.1 X |
| 4,347,717 | 9/1981 | Lamarche | 192/106.2 X |

FOREIGN PATENT DOCUMENTS 2034004  5/1980  United Kingdom ............. 192/106.2

Primary Examiner—Rodney H. Bonck
Assistant Examiner—James J. Merek
Attorney, Agent, or Firm—Donald J. Harrington; Keith L. Zerschling

[57] ABSTRACT

A damper assembly for cushioning the application of a torque delivery clutch in a torque converter transmission wherein the converter provides a complementary hydrokinetic torque delivery path, the damper assembly including a pair of cushioning springs acting in parallel and a third spring arranged in series relationship with respect to the paired cushioning springs, the spring rates being chosen to provide dampening forces that vary nonlinearly with the magnitude of the torque delivered through the damper.

10 Claims, 12 Drawing Figures

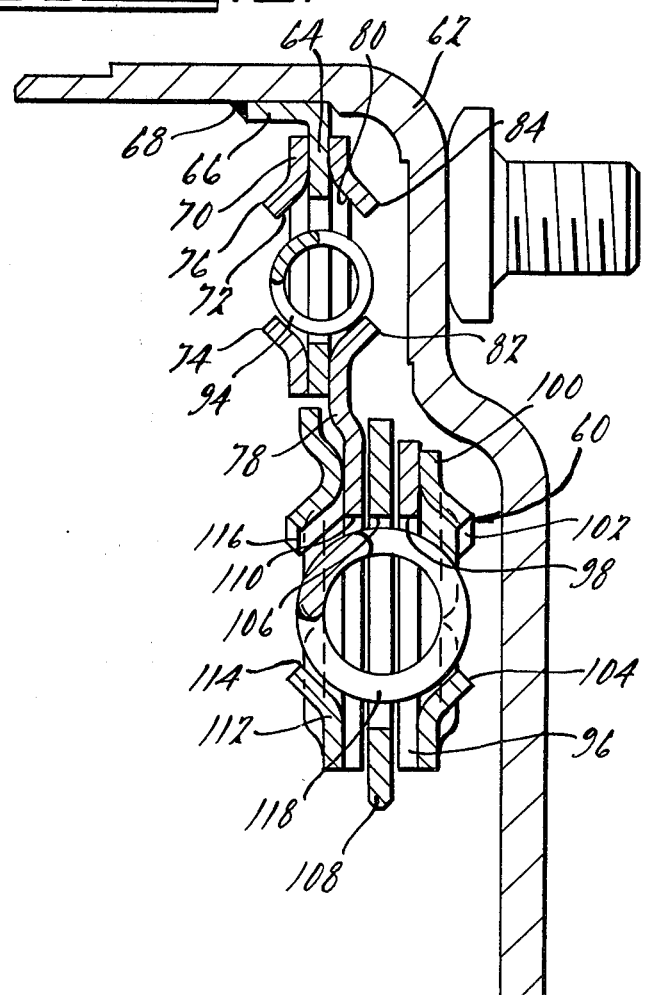
Fig. 1.
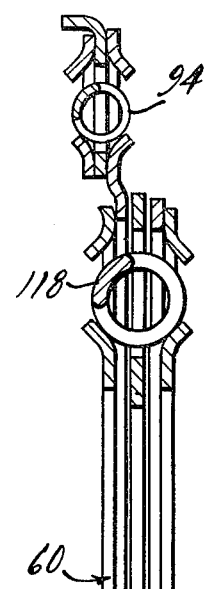
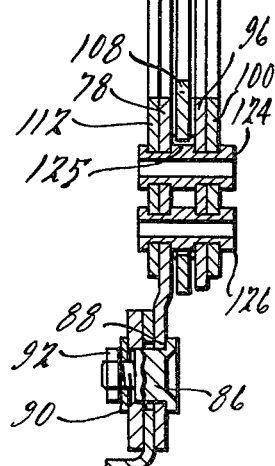
Fig. 2.

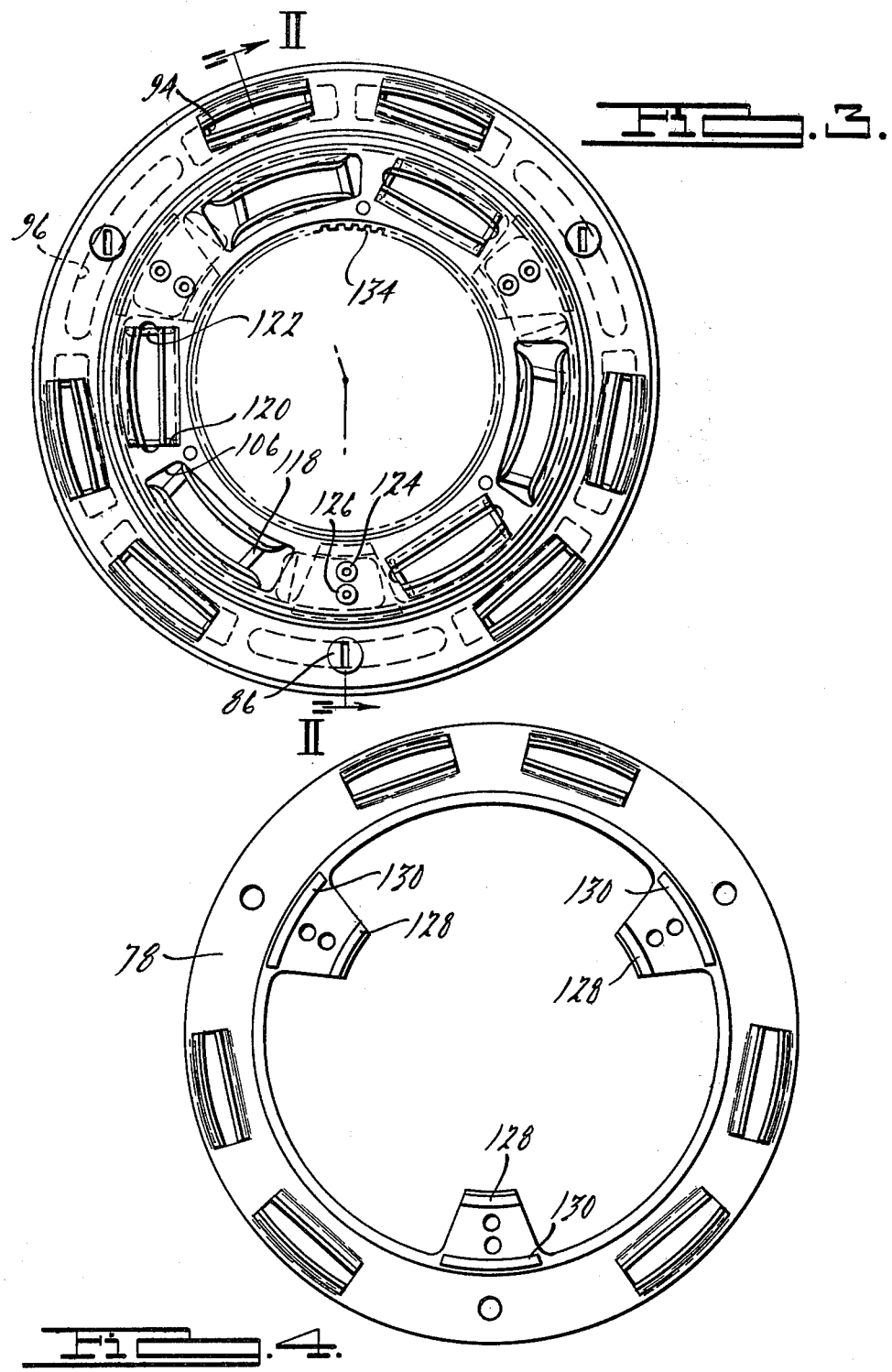

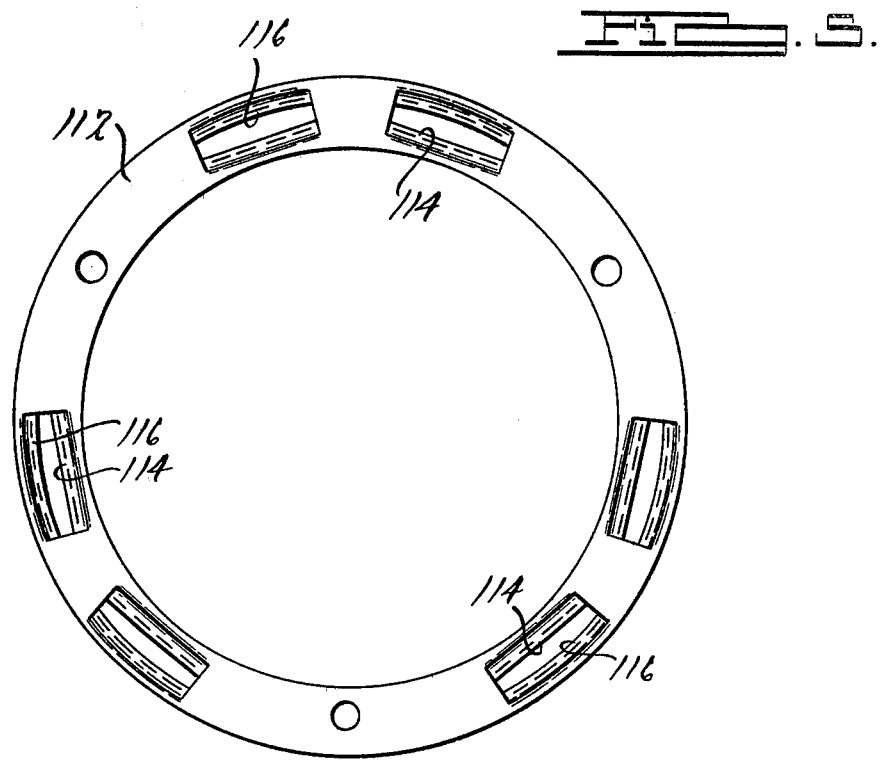
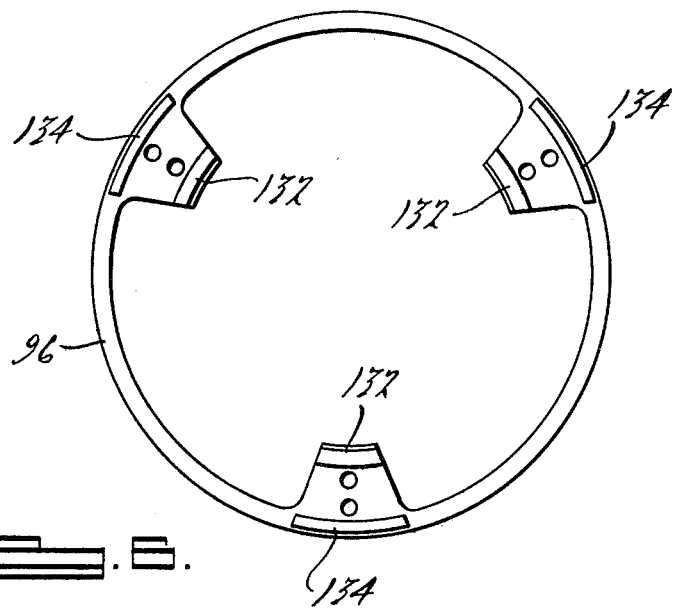

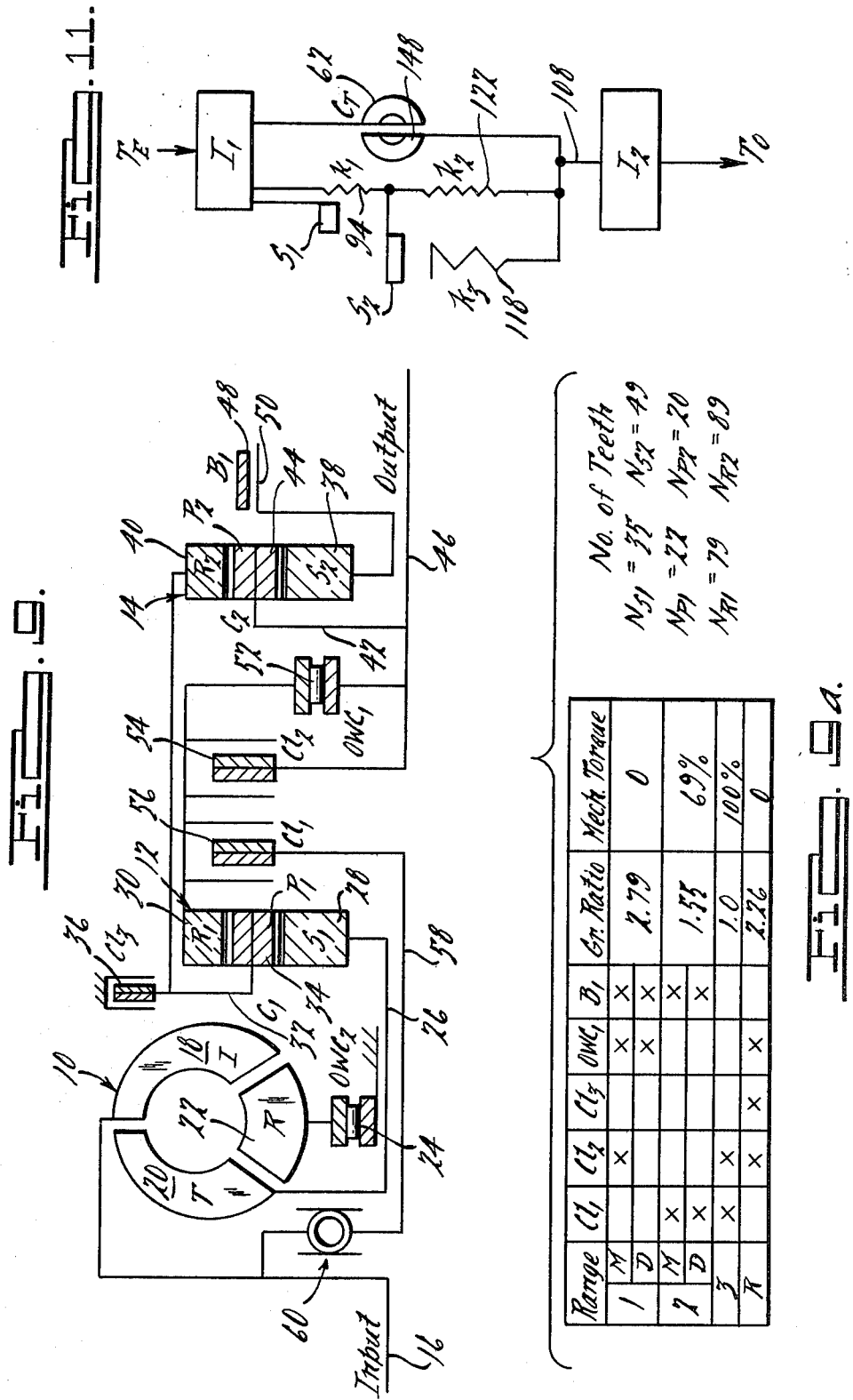

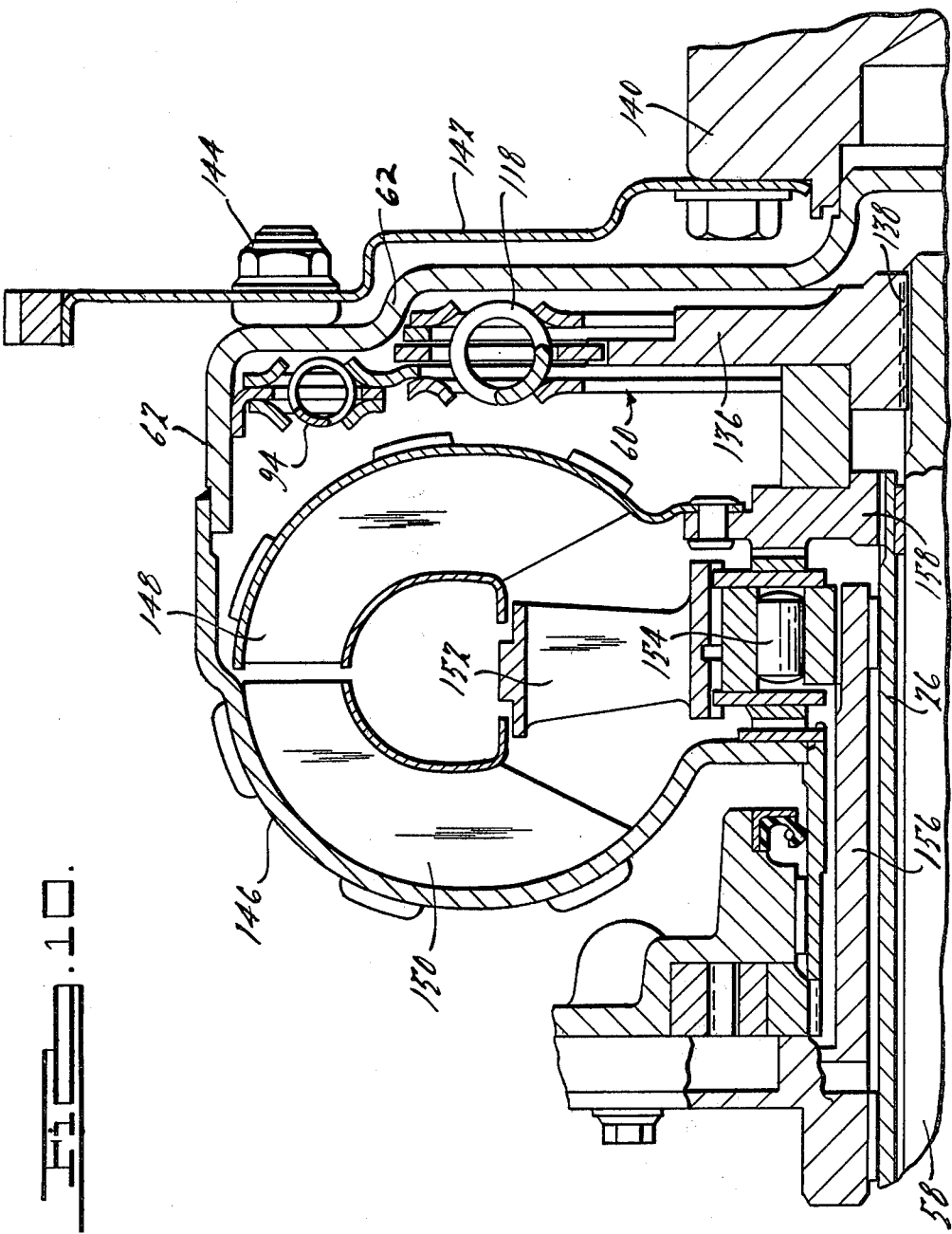

4,422,535

COMPOUND DAMPER ASSEMBLY FOR AN AUTOMATIC TRANSMISSION

GENERAL DESCRIPTION OF THE INVENTION

My invention comprises improvements in damper assemblies of the kind shown in U.S. Pat. Nos. 4,143,561; 4,027,757 and 4,138,003. Each of these references shows a damper assembly that includes compound springs located in a clutch plate situated in an impeller housing of a torque converter. They are designed to cushion the application of a direct drive friction clutch which locks together the impeller and the turbine of the converter to establish a mechanical torque delivery path arranged in parallel disposition with respect to the hydrokinetic torque delivery path provided by the bladed members of the converter.

A typical gear set that is adapted to accommodate a converter and damper assembly of the kind herein disclosed may be seen by referring to U.S. Pat. Nos., 3,314,307 and 3,491,617 issued to Egbert and Konrad, respectively. Each of these patents describes compound planetary gear sets with a hydrokinetic torque converter between the gear set torque input elements and an internal combustion engine in a vehicle driveline. An overdrive clutch is adapted to connect directly the engine crankshaft or converter impeller to the compound carrier of the gear unit, thereby establishing an overdrive ratio. Upon engagement of the overdrive clutch in this fashion the hydrokinetic torque delivery path through the gearing and converter is interrupted and a fully mechanical torque delivery path is substituted. The converter damper assembly of my invention cushions the engagement of the overdrive clutch and prevents undesirable resonant frequencies from developing due to the inertia forces on the torque delivery elements in the transmission itself and due to the forced vibrations in the driveline normally associated with an internal combustion engine.

In drivelines of this type it is usual practice to provide an inertia flywheel to cushion the engagement of the clutches and brakes of the transmission and to absorb transient torque variations and torsional vibrations. Although a flywheel still may be required in a driveline incorporating the improved damper mechanism of my invention, the mass of the flywheel may be reduced greatly without impairing driveability. The resonant vibrations normally absorbed by a larger flywheel can be accommodated instead by the damper assembly of my invention, which has a substantially smaller mass.

My invention comprises a first set of damper springs located in a radially outward location within the impeller housing for the converter. The torque output side of the first spring set is connected to the input side of an assembly of springs located at a radially inward location in series relationship. The radially inward springs are arranged in parallel disposition and torque is transmitted through them from the impeller of the converter to the hub of the bladed member of the converter. One set of these radially inward springs is preloaded to provide a continuous cushioning action upon deflection of the torque input element with respect to the torque output element of the damper assembly. The other set of the radially inward springs is not preloaded, but it is effective to establish an additional cushioning action when relative angular displacement of the input and output elements of the damper assembly exceeds a predetermined value.

The cushioning action of the parallel springs as well as the radially outward set of springs provides a cushioning spring force to complement a friction damping force developed by friction damping elements located between the relatively movable input and output elements of the damper assembly.

None of the prior art patents mentioned in the preceding paragraphs shows a triple stage damper spring assembly. Neither do they teach a strategic disposition of the three independently acting spring assemblies to effect cushioning action of varying magnitude depending upon the torque delivered through the driveline. Neither do they teach the use of a friction damper mechanism in combination with such spring assemblies. To counteract undesired resonant vibrations in a transmission and engine driveline.

BRIEF DESCRIPTION OF THE FIGURES OF THE DRAWINGS

FIG. 1 shows a cross-sectional assembly view of the compound spring portion of my improved damper assembly.

FIG. 2 is a reduced size cross-sectional drawing of the complete damper assembly shown in part in FIG. 1 as seen from the plane of section line 2—2 of FIG. 3.

FIG. 3 is a side elevation view of the damper assembly of FIG. 2 and FIG. 1.

FIG. 4 is a side elevation view of a damper plate which forms a part of the damper assembly of FIG. 2.

FIG. 5 is a side elevation view of a spring retainer which forms a part of the assembly of FIG. 2.

FIG. 6 is a side elevation view of a friction damper plate which forms a part of the assembly of FIG. 2.

FIG. 9 is a schematic representation of a gear train adapted to accommodate a damper with a hydrokinetic torque converter in accordance with the teachings of my invention.

FIG. 9A is a chart showing the clutch and brake engagement and release pattern for the gear system of FIG. 9.

FIG. 10 shows an assembly of the damper assembly of FIG. 1 with a torque converter of the kind used in the FIG. 9 construction.

FIG. 11 is a schematic diagram showing the spring force arrangement for the damper construction of my invention.

PARTICULAR DESCRIPTION OF THE INVENTION

Figure 7:
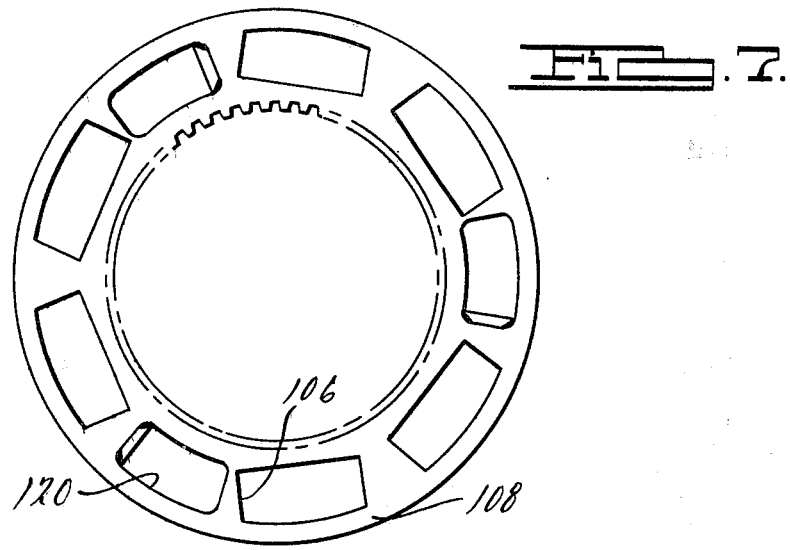
FIG. 7 is a side elevation view of a spring retainer plate which forms a part of the assembly of FIG. 2.

In FIG. 9 I have shown in schematic form a gear train for use in a driveline for an automotive vehicle. The gear train is adapted to accommodate the damper assembly of my invention. It includes hydrokinetic torque converter 10 and a gear system comprising two simple planetary gear units shown at 12 and 14. A torque input shaft 16 which is driven by the crankshaft of an internal combustion engine, not shown, is connected directly to the impeller 18 of the torque converter 10. A bladed turbine 20 of the converter 10 is arranged in toroidal fluid flow relationship with respect to the impeller 18. A reactor 22, which is a bladed member like the impeller and the turbine, is situated between the flow exit section of the turbine 20 and the flow entrance section of the impeller 18. An overrunning brake 24 permits freewheeling motion of the reaction 22 in a freewheeling direction, which coincides with the direction of rotation of the engine, but prevents rotation of the reactor in the opposite direction.

Turbine 20 is connected to a turbine shaft 26 which serves as a torque input shaft for sun gear 28 of the gear unit 12. Gear unit 12 includes also ring gear 30, planetary carrier 32 and planet pinions 34 supported rotatably on the carrier 32. Carrier 32 is adapted to be braked by a friction brake 36 during operation in reverse.

Gear unit 14 comprises sun gear 38, ring gear 40, carrier 42 and planet pinions 44 journalled rotatably on the carrier 42, the latter being connected to output shaft 46. The differential and axle assembly for the vehicle traction wheels is geared directly to the output shaft 46.

Sun gear 38 is adapted to be braked by brake band 48 which surrounds brake drum 50 connected to the sun gear 38. Brake band 48 is applied during operation in the first and second underdrive ratios.

Ring gear 30 of the forward planetary gear unit 12 is adapted to be connected to output shaft 46 through a one way driving overrunning clutch 52. Overrunning clutch 52 is adapted to transmit torque during operation in the forward driving low speed ratio as well as during reverse drive operation. The overrunning clutch 52 is bypassed by friction clutch 54, which is adapted to deliver torque to the output shaft 46 from the ring gear 30 when the transmission is conditioned for manual low operation when upshifting from the low ratio is prevented. It is engaged also to deliver torque to the output shaft 46 during direct drive third speed ratio operation and during reverse drive operation.

Another friction clutch 56 is adapted to connect a central drive shaft 58 to the ring gear 30 and to the input side of overrunning clutch 52. The engagement of the clutch 56 is cushioned by friction and spring damper assembly 60. The construction of the damper assembly 60 will be described with reference to the other figures. Upon engagement of the clutch 56 a direct mechanical connection is established through the damper assembly 60 from the input shaft 16 to the torque input elements of the gearing. During operation in the intermediate ratio as well as the third speed direct drive ratio.

In FIG. 9A I have shown a table that sets forth a pattern for the engagement and release of the clutches and brakes in the gear system of FIG. 9 to establish the various speed ratios including three forward drive ratios and a reverse drive ratio. For purposes of understanding FIG. 9A, the symbol $CL_1$ stands for the forward clutch 56, the symbol $CL_2$ stands for the rear clutch 54, the symbol $CL_3$ stands for the disc brake 36, the symbol $OWC_1$ stands for the overrunning clutch 52 and the symbol $B_1$ stands for the brake band 48. The various drive ranges are indicated as drive range "1" which has a manual, continuously-operating drive mode M and an automatic drive mode D from which automatic upshifts can occur. Drive range "2" also includes a manual drive mode M in which the transmission is continuously operated in the second ratio and an automatic drive mode D from which upshifts and downshifts can occur automatically to the adjacent ratios. Drive range "3" is a direct drive ratio wherein the input shaft 16 is connected through the simultaneously engaged clutches $CL_1$ and $CL_2$ to the output shaft 46, thus bypassing the hydrokinetic torque flow path.

During operation in the second drive range torque is distributed mechanically through a torque flow path that includes the engaged clutch $CL_1$. The balance of the torque is distributed hydrokinetically by the torque converter through a path in parallel relationship with respect to the mechanical torque delivery path. In the embodiment shown in FIGS. 9 and 9A, 69 percent of the torque is distributed mechanically and 31 percent is distributed hydrokinetically. In contrast 100 percent of the torque is distributed hydrokinetically during operation in the first drive range wherein the clutch $CL_2$ is engaged and the clutch $CL_1$ is disengaged. Brake band 48 is applied to establish a reaction point.

During operation in reverse drive, clutch $CL_2$ is engaged and brake $CL_3$ is engaged. All of the torque is distributed hydrokinetically during reverse drive as turbine torque is distributed to the sun gear 28 and the ring gear 30 is driven in reverse direction. The brake $CL_3$ provides a reaction point for the carrier 32 during reverse drive operation.

In FIGS. 1 and 2 I have shown in detail the elements of the damper assembly illustrated schematically in FIG. 9 at 60. The damper assembly 60 includes a portion of the torque converter impeller housing 62. A converter damper plate 64 is secured at its radially outward margin 66 to the inner peripheral surface of the impeller shell part 62 preferably by welding as shown at 68.

An annular damper plate 70, as best seen in FIG. 5, is located on one side of the damper plate 64. It is provided with a plurality of angularly spaced spring openings 72 that are formed in the plate by a die punching operation which deforms the metal away from the plane of the plates indicated at 74 and 76 to form a spring retainer. Another damper plate 78 is situated on the opposite side of the damper plate 64 and, like the plate 70, it is formed with a plurality of angularly spaced spring openings 80 preferably by means of a die punching operation. The openings are formed by flanging the metal of the plate as shown at 82 and 84 to form spring retainers. The plates 70 and 78 are joined together by a plurality of bolts, preferably three in number, as shown at 86. Each bolt is provided with a shoulder 88 which engages the plate 78. A friction washer 90 is located between a lock nut 92 and the outer face of the damper plate 70. Bolts 86 are received in registering openings formed in the plates 78 and 70 with a close fit so that the plates 78 and 80 will be held in assembled relationship and will move in unison.

The stamped spring openings 72 and 80 in the plates 70 and 78, respectively, are arranged in juxtaposed registry and they receive damper springs 94, one spring being situated in each opening. The length of the springs is substantially equal to the length of the openings but they are not prestressed or preloaded. The plate 64 has a plurality of circumferentially spaced slots 96 having a radial thickness slightly larger than the diameter of the bolts 86. The slots permit relative angular displacement of the plate 64 relative to the plates 70 and 78.

Washer 90 can be substituted with a wavy washer so that a spring load can be applied to the assembled plates 70, 64 and 78 to provide frictional resistance to relative movement of the plate 64 with respect to the joined plates 70 and 78. Friction material between the plate 64 on the one hand and the joined plates 70 and 78 on the other hand can be introduced between them to establish a frictional drag that resists relative displacement of the plates 64 with respect to the joined plates 70 and 78.

Another damper plate 96 is located radially inward of the springs 94. It is provided with open spaces 98. Secured to the outboard side of the plate 96 is an annular plate 100 which is formed with stamped spring openings having spring retainer flanges 102 and 104 on the sides thereof. These spring openings register with the openings 98 which in turn register with openings 106 formed in damper plate 108.

The damper plate 78 previously described is situated on the opposite side of the plate 108 and it too is formed with spring openings as shown at 110. A companion damper plate 112 is joined to the side of the damper plate 78. Stamped spring openings are formed in the plate 112, and they too are provided with spring retainer flanges 114 and 116. The openings in the plates 112, 78, 108, 96 and 100 are aligned and they receive therein damper springs 118, one spring being situated in each set of aligned openings. The springs are not preloaded but rather are loosely fitted with respect to their axial dimensions in their respective openings with a calibrated clearance between the spring ends and the circumferential ends of the openings. They are designed to resist relative movement between the damper plate 108 and the damper plate 78 only after a predetermined angular displacement of one plate with respect to the other occurs. In the embodiment disclosed in the specification, damper springs 94 are designed to provide resistance to relative displacement of the plate 64 with respect to the plate 78 before the springs 118 are effective to resist relative displacement between the plates 78 and 108.

As best seen in FIG. 7 the plate 108 includes a second set of spring openings 120 which are situated between adjacent openings 106. They are slightly smaller in arcuate extent than the corresponding dimension of the openings 106. Springs 122 are situated in the openings 120 and these, unlike the springs 118, are preloaded with a predetermined prestress. The circumferential length of the openings 120 is less than the free length of the springs 122 by a predetermined amount.

The plates 96 and 100 are joined together by a pair of rivets 124 and 126. The same rivets connect together adjacent plates 78 and 112. The pair of plates 96 and 100 is separated from the pair of plates 78 and 112 by a spacer shoulder 125. Plate 108 is positioned between the plates 78 and 96 with a clearance therebetween. That clearance is adapted to accommodate friction material 128 and 130 formed on one side of the plate 78, as seen in FIG. 4 and in FIG. 2. In a similar fashion, plate 96 is formed with friction material 132 and 134 on one side thereof as seen in FIG. 6. The friction material on the plates 96 and 78 creates a frictional drag that resists relative angular displacement of the plates 108 with respect to each of the plates 78 and 96.

The rivet 126 is similar in form to the rivet 124 and is formed with a central shoulder which cooperates with end shoulders on the rivet to hold fast the paired plates 96 and 100 in spaced relationship with respect to the paired plates 78 and 112.

The internal margin of the plate 108 is provided with splined teeth 134 to permit a splined driving connection with external splined teeth formed on the hub of torque transfer path 58, which is not specifically illustrated in the schematic drawing of FIG. 9 but which is shown at 136 in FIG. 10. The hub 136 is splined at 138 to the torque delivery shaft 58.

Referring again to FIG. 10, the engine crankshaft is illustrated in 140. It is connected through a drive plate 142 to the impeller shell part 62 by bolts 144.

The impeller housing includes, in addition to the part 62, a semi-torus shaped part 146 which is joined at the periphery thereof to the part 62 to form an enclosure in which turbine 148 is situated. Impeller blades 150 are secured to the inner margin of the impeller part 156 to partly define a torus circuit in the usual way. A bladed stator 152 is located between the flow entrance section of the impeller blades 150 and the flow exit section of the bladed turbine 148. An overrunning brake 154 supports the stator 152 on stationary stator shaft 156 and prevents rotation of the stator in a direction opposite to the direction of rotation of the impeller.

Turbine 148 has a turbine hub 158 which is splined to turbine sleeve shaft 26. The shaft 58 and the shaft 26 each is connected to separate torque input elements of the transmission gearing as illustrated schematically in FIG. 9.

In FIG. 11 I have shown the spring and damper system. In the diagram of FIG. 11 the term $T_e$ refers to the engine torque and the term $T_o$ refers to the torque delivered through the damper assembly to the shaft 58. The engine, the impeller housing, the drive plate, the engine flywheel and the engine elements that rotate with the flywheel develop an inertia force; and the mass that develops that inertia force is designated in the schematic drawing of FIG. 11 by the symbol $I_1$. The spring 94 has a spring rate $K_1$, as seen in FIG. 11. The springs 122 have a spring rate $K_2$ and the springs 118 have a spring rate $K_3$. The symbols $S_1$ and $S_2$ designate respectively the stops for limiting the deflection of the spring 94 and for determining point at which the spring 118 begins to deflect upon deflection of the springs 122.

Figure 8:
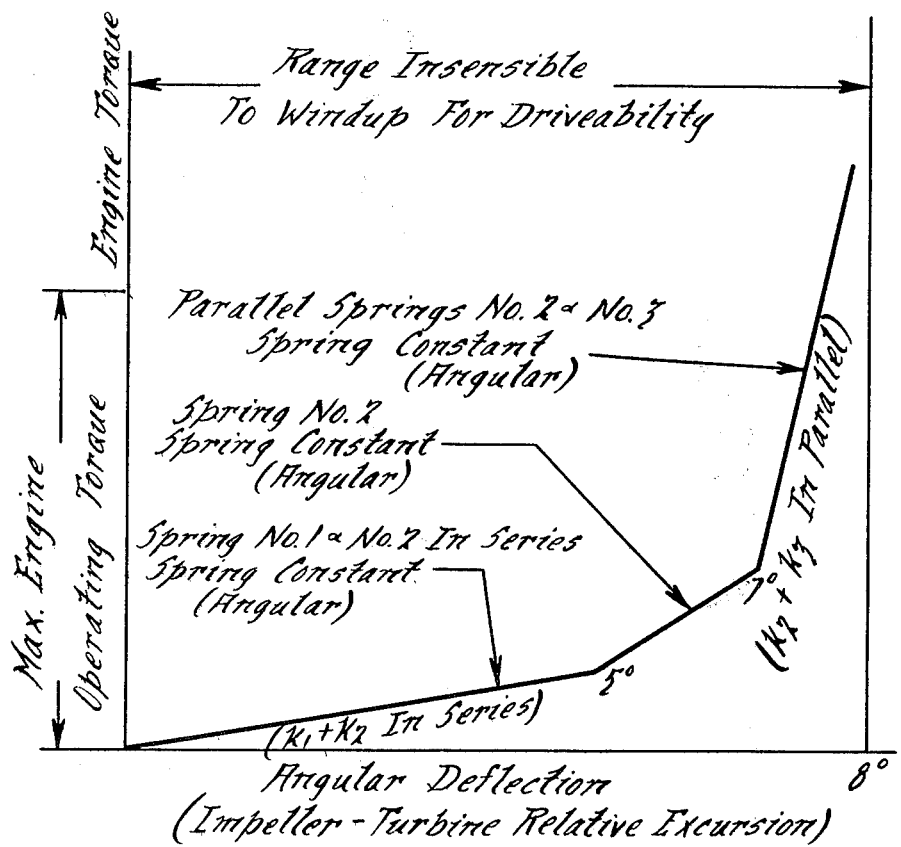
FIG. 8 is a chart showing the relationship between the torque transmitted through the damper and the angular deflection of the relatively movable parts of the damper.

During initial deflection of the disc of plate 64 with respect to the plate 78, springs 94 begin to deflect and the spring force of the springs is transmitted through preloaded springs 122 to the output plate 108 to which an output inertia mass $I_2$ is connected. When the springs 94 become bottomed out or reach their solid height, an increase in the effective damper spring rate takes place as springs 122 continue to deflect. After a predetermined deflection of springs 122 takes place, the ends of the slots in plate 100 engage the springs 118 thereby causing springs 118 and 122 to deflect in parallel. This increases the effective spring rate at the damper assembly. This three stage characteristic of the damper assembly is illustrated in FIG. 8. In FIG. 8 the angular deflection of the damper assembly is plotted against the operating torque. The performance is characteristized by three straight lines. During initial deflection as seen in FIG. 8, springs 94 and springs 122 act in unison to develop a relatively low spring rate. After the springs 94 bottom out or reach their solid height, springs 122 are the only damper springs that are effective in the assembly. The spring rate, therefore, increases; and this is evidenced by an increase in the slope of the characteristic curve of FIG. 8. If deflection continues to a total angular deflection of about 7 degrees, springs 118 begin to deflect in parallel relationship with respect to the deflection of springs 122. This produces a sharp increase in the slope of the characteristic curve of FIG. 8. If deflection continues, the pins 86 reach the end of the slots 96 thereby limiting the deflection of the damper assembly and establishing a solid connection between the input side of the damper and the output side. The angular extent of the slots 96 with respect to their pins 86 is illustrated best in the side elevation view of FIG. 3.

By using a three stage damper of my invention, it is possible to reduce the size of the flywheel in avoiding resonance vibrations in an engine and transmission combination. This reduces weight of the vehicle driveline, improves responsiveness of the engine to changing torque demands and improves the drivability of a vehicle employing a driveline having my improved driveline assembly by eliminating undesirable resonant vibrations.

Having thus described a preferred embodiment of my invention, what I claim and desire to secure by U.S. Letters patents is:

1. In a hydrokinetic torque converter transmission adapted to deliver driving torque from an internal combustion engine to a drive shaft including a hydrokinetic torque converter having an impeller connected to said engine, a multiple ratio gear system having an output gear element connected to said drive shaft, said converter having a turbine connected to torque input elements of said gear system, and a mechanical torque delivery path in parallel relationship with respect to said hydrokinetic converter for establishing a mechanical torque flow path that is independent of the hydrokinetic torque flow path of the hydrokinetic converter;

said torque flow path comprising a damper assembly having a first damper plate connected to said impeller, a torque delivery shaft connected to an input element of said gear system, a torque output plate in said damper assembly, an intermediate damper plate in said damper assembly located between said first and second damper plates;

a first set of damper springs in said damper assembly establishing a yieldable spring connection between said first damper plate and said intermediate damper plate, and second and third sets of damper springs arranged in parallel disposition one with respect to the other and establishing a yieldable spring connection between said intermediate damper plate and said output damper plate, said first spring set being arranged in series disposition with respect to one of the other two sets of springs whereby said damper assembly is characterized by three characteristic operating stages including a first stage in which one set of springs of said other set acts in series relationship with said first set to establish a relatively low spring rate, a second characteristic operating stage wherein said one set of said other sets of springs establishes a spring damping force and a third characteristic operating stage wherein said second and third sets of springs act in parallel relationship in unison with the first series of springs inactive thereby establishing a final damper spring rate of high magnitude.

2. The combination as set forth in claim 1 wherein said first set of springs is located radially outwardly with respect to said second and third sets of springs, the second set of springs being preloaded to establish a continuous cushioning force in said damper assembly throughout the entire range of angular deflection of said first damper plate with respect to said output damper plate.

3. The combination as set forth in claim 2 wherein said first set of springs is not preloaded and is effective to act in series relationship with respect to said second set of springs throughout on initial range of deflection of said first plate with respect to said output plate, and means for limiting the degree of deflection of said first plate with respect to said intermediate plate thereby establishing a change in the effective spring rate of said damper assembly.

4. The combination as set forth in claim 2 wherein said third set of springs is assembled in said damper assembly with no preload, said first of springs being adapted to bottom out to a solid height thereby being effective to transmit torque directly through a solid connection therethrough from said first plate to said intermediate plate after a first limiting value of torque is applied to said damper assembly.

5. The combination as set forth in claim 3 wherein said third set of springs being assembled in said damper assembly with no preload, said first set of springs being adapted to bottom out to a solid height thereby being effective to transmit torque directly through a solid connection therethrough from said first plate to said intermediate plate after a first limiting value of torque is applied to said damper assembly.

6. The combination as set forth in claim 1 including friction elements defining friction surfaces between said intermediate plate and said output plate thereby establishing a friction damping force to complement the cushioning force of said series of springs.

7. The combination as set forth in claim 2 including friction elements defining friction surfaces between said intermediate plate and said output plate thereby establishing a friction damping force to complement the cushioning force of said series of springs.

8. The combination as set forth in claim 3 including friction elements defining friction surfaces between said intermediate plate and said output plate thereby establishing a friction damping force to complement the cushioning force of said series of springs.

9. The combination as set forth in claim 4 including friction elements defining friction surfaces between said intermediate plate and said output plate thereby establishing a friction damping force to complement the cushioning force of said series of springs.

10. The combination as set forth in claim 5 including friction elements defining friction surfaces between said intermediate plate and said output plate thereby establishing a friction damping force to complement the cushioning force of said series of springs.

* * * * *